United States Patent
Bruno et al.

(10) Patent No.: US 6,825,771 B2
(45) Date of Patent: Nov. 30, 2004

(54) IDENTIFICATION SYSTEM

(75) Inventors: David Bruno, Portland, OR (US); Marc Bowman, McMinnville, OR (US)

(73) Assignee: Veris Industries, LLC, Portland, OR (US)

(*) Notice: Subject to any disclaimer, the term of this patent is extended or adjusted under 35 U.S.C. 154(b) by 154 days.

(21) Appl. No.: 10/109,115

(22) Filed: Mar. 26, 2002

(65) Prior Publication Data

US 2003/0102968 A1 Jun. 5, 2003

Related U.S. Application Data

(60) Provisional application No. 60/334,911, filed on Nov. 30, 2001.

(51) Int. Cl.[7] .............................................. G08B 21/00

(52) U.S. Cl. ............... 340/638; 340/636.1; 340/636.12; 340/636.13; 340/636.15

(58) Field of Search .................................. 340/638, 635, 340/636.12, 636.13, 636.15, 636.1, 652, 653, 657–664

(56) References Cited

U.S. PATENT DOCUMENTS

| 5,578,927 | A | * | 11/1996 | Perelle | 324/434 |
|---|---|---|---|---|---|
| 6,133,709 | A | * | 10/2000 | Puchianu | 320/116 |
| 6,373,238 | B2 | | 4/2002 | Lewis et al. | 324/107 |
| 6,404,166 | B1 | * | 6/2002 | Puchianu | 320/116 |

* cited by examiner

Primary Examiner—Toan N. Pham
(74) Attorney, Agent, or Firm—Chernoff Vilhauer McClung & Stenzel, LLP

(57) ABSTRACT

A system for identifying the relative location of devices.

24 Claims, 6 Drawing Sheets

IDENTIFICATION SYSTEM

This application claims the benefit of U.S. Patent Application Ser. No. 60/334,911 filed on Nov. 30, 2001.

BACKGROUND OF THE INVENTION

The present invention relates to an identification system.

Referring to FIG. 1, many electrical power distribution systems include a power panel enclosure 10 into which is provided electrical power using one or more sets of wires 12. The electrical power may have any voltage, any current, and any number of phases (e.g., single phase, two phases, or three phases). Each phase of the electrical power to the power panel is normally provided to a separate bus bar 14a, 14b, and 14c, which are normally elongate conductors within the power panel 10. A plurality of circuit breakers 16a, 16b, 16c, etc., which trip or otherwise selectively disconnect electrical power, are electrically interconnected between one or more of the bus bars 14a, 14b, and 14c, and respective loads 18 external to the power panel 10. In many power panels 10 the circuit breakers 16 are vertically aligned in one or more strips 20 and 22. When the load 18 interconnected to a respective circuit breaker 16 within the power panel 10 draws excessive electrical current then the circuit break 16 trips or otherwise disconnects the electrical power to the load 18. In this manner, if a load shorts and thereafter draws excessive current then the circuit breaker will trip.

In a business or residential environment a set of electrical loads, such as motors, outlets, heaters, lights, machinery, instrumentation, etc., may be electrically interconnected to a single circuit. When the electrical current provided to the loads from a single circuit is excessive then the respective circuit breaker(s) will disconnect the electrical power to all of the loads. Initially, the anticipated current requirements for all of the loads interconnected to a single circuit breaker (s) may be added together to ensure that the total load will be sufficiently below the rating for the circuit breaker. In this manner, the circuit breaker will not inadvertently trip with normal variations in the current drawn by the loads. However, after the initial installation of the loads and a suitable circuit breaker for those loads, additional loads are frequently added to existing circuits without sufficient consideration of the total existing load for the respective circuit breaker(s). If excessive additional loads are added to the circuit breaker(s), then the circuit breaker(s) will have a tendency to trip during normal operation. While this may be generally acceptable in a residential environment, in a business environment the unanticipated tripping of the circuit breaker, especially when none of the loads are actually shorted, is simply unacceptable.

For example, in a computer server farm environment five circuit breakers may each be electrically interconnected to five computer servers, having a total of twenty-five computer servers. If three additional computer servers are added to the computer server farm, they may be electrically interconnected to the same circuit breaker. Frequently the installer is in a hurry to install the three additional computer servers to the network and interconnects the additional three computer servers to any readily available power outlet. However, having eight computer servers electrically interconnected to a single circuit breaker, which is properly sized for only five computer servers, will likely result in tripping the circuit breaker during normal usage. This may be simply unacceptable for operating a computer server farm where uninterrupted service is important. In many cases, the power provider to the server farm guarantees up time of the power provided to the computer servers. In the event that the power is interrupted, the power provider may be required to pay a substantial financial penalty.

Referring to FIG. 2, to monitor the current levels of individual circuit breakers 16 a respective current sensor 20 may be interconnected to the wire on the load side of the respective circuit breaker 16. The outputs 22 of each of the current sensors 20 may be interconnected to a current monitor 24 which signals an alarm condition if the output of one of the current sensors is to high. The current sensors 20 may be interconnected to one or more current monitors. It takes considerable time to install, at significant expense, all of the current sensors 20. In addition, because of the significant number of individual wires 22 an installer has a significant tendency to interconnect the wires 22 to improper places within the current monitor 24 and in particular to mismatch pairs of wires 22 from the same current sensor 20 rending the current sensors 20 ineffective. Moreover, it is problematic to ensure that the wires 22 indicated by the installer that relate to a particular current sensor 20 actually are interconnected to the desired current sensor 20. Typically, an installer likewise programs the current monitor 24 to indicate which wires attached to its interface are associated with which circuit breaker, and thus which load. Without proper attachment of the matched pairs of wires and attaching the wires in the proper location, any information that may be obtained may be simply nonsensical and relate to the wrong load (circuit breaker(s)), respectively. In summary, the potential installation problems are significant, especially when installed by untrained technicians.

What is desired, therefore, is an effective identification system.

DETAILED DESCRIPTION OF THE PREFERRED EMBODIMENT

The present inventors reflected on the limitations inherent to using multiple current sensors for a set of circuit breakers within the power panel 10 and considered enclosing respective pairs of wires 22 in a single wire wrap to reduce the likelihood of mixing respective pairs together. Also, color coding of the respective pairs of wires 22 and corresponding color coding of the respective current sensors 20 would likewise reduce the likelihood that respective wires 22 and current sensors 20 would be mismatched. While such an arrangement is an improvement the present inventors still consider it burdensome to install multiple such sensor/wire combinations, relatively expensive, and remains prone to some likelihood of installation error. Moreover, such an arrangement is prone to errors in the identification of each of the devices.

After considering the aforementioned limitations and potential improvements, the present inventors came to the realization that modifying the interconnection of the devices to a "serial" interconnection, or otherwise interconnected to one another, permits a significantly reduced amount of wires. Further, with a "serial" interconnection of the devices the present inventors determined that the propagation of signals among the devices may be used, at least in part, as the basis of determining the relative position or interconnection order of each device. Moreover, this identification technique based upon the propagation of signals among the devices is applicable to any set of devices, in general, that are free from being rigidly interconnected with respect to one another. The devices may be any type of item that may provide information to a monitor, such as for example, a current sensor, a power sensor, a voltage sensor, a humidity sensor, a rain level sensor, a sound transducer, a frequency coupler, a motion sensor, a location sensor, a weight sensor, and an acoustic vibration sensor.

Figure 1:
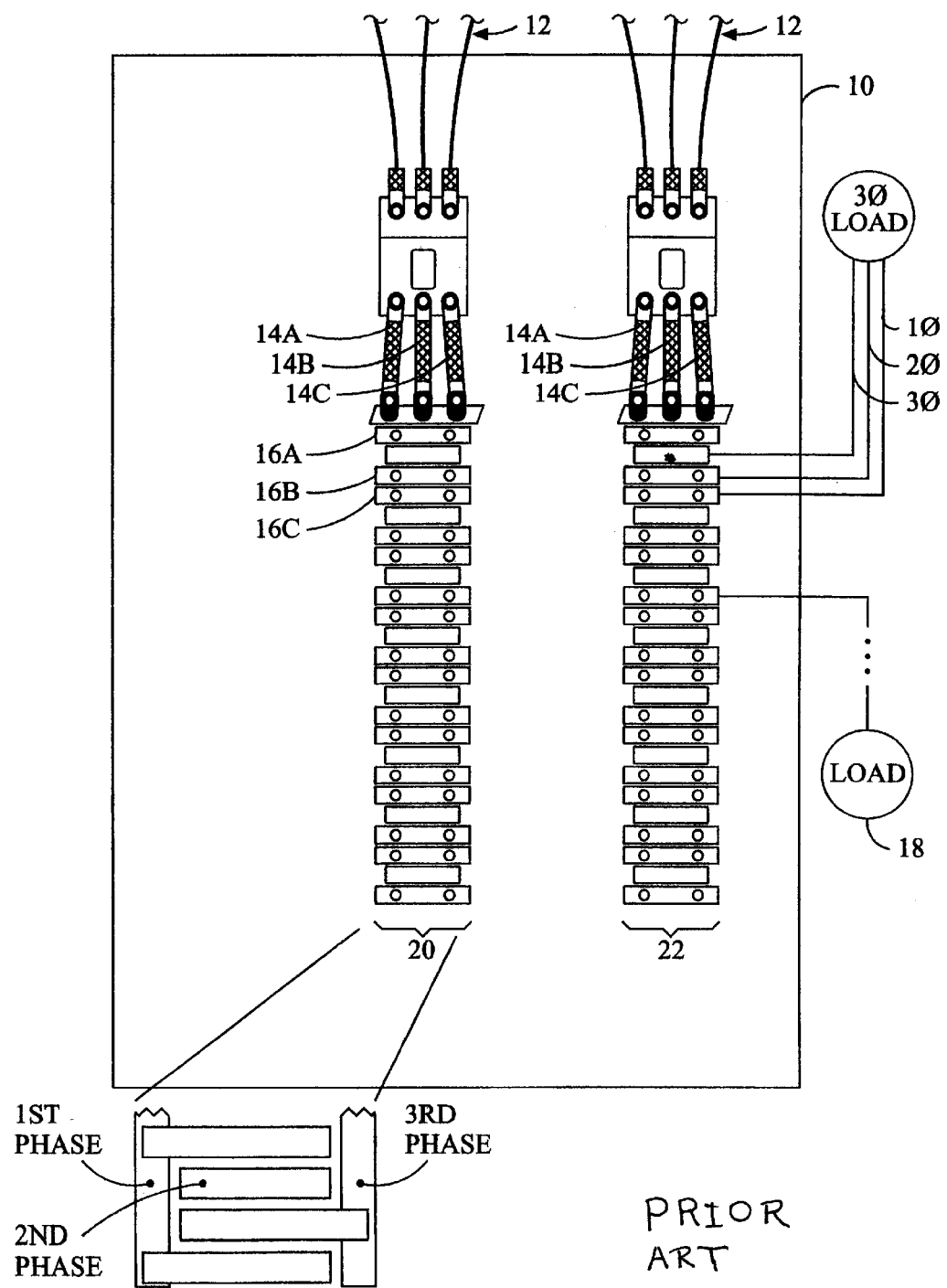
FIG. 1 illustrates a power panel with circuit breakers.
Figure 2:
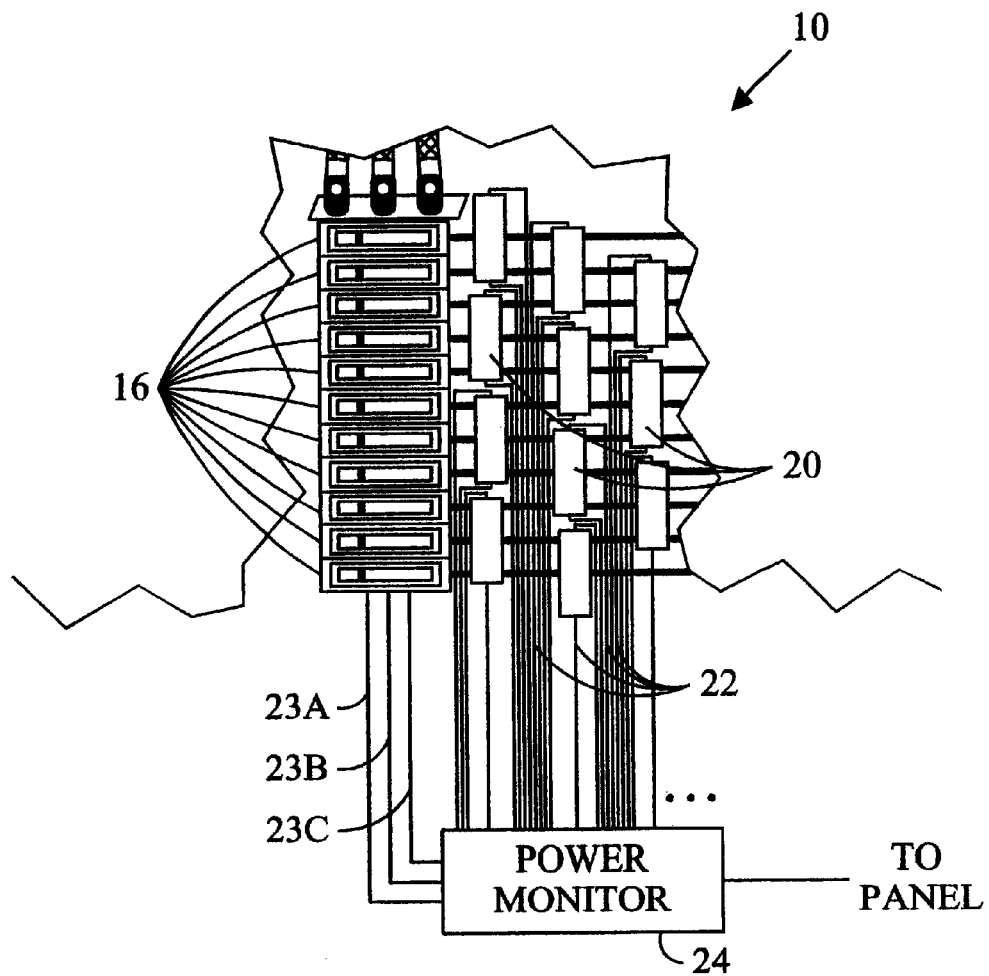
FIG. 2 illustrates circuit breakers and associated sensors.
Figure 3:
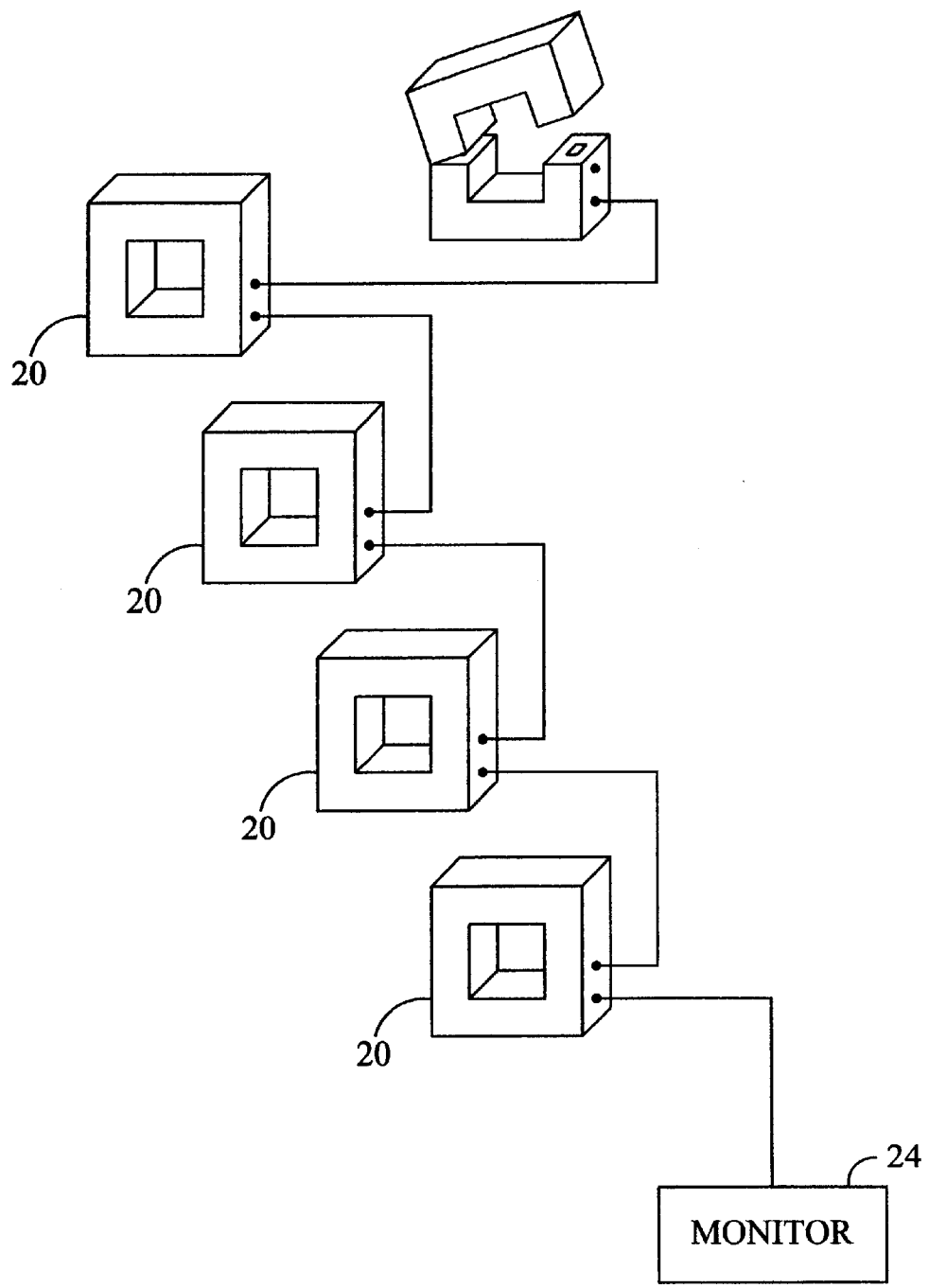
FIG. 3 illustrates a set of interconnected devices and a monitor.
Figure 4:
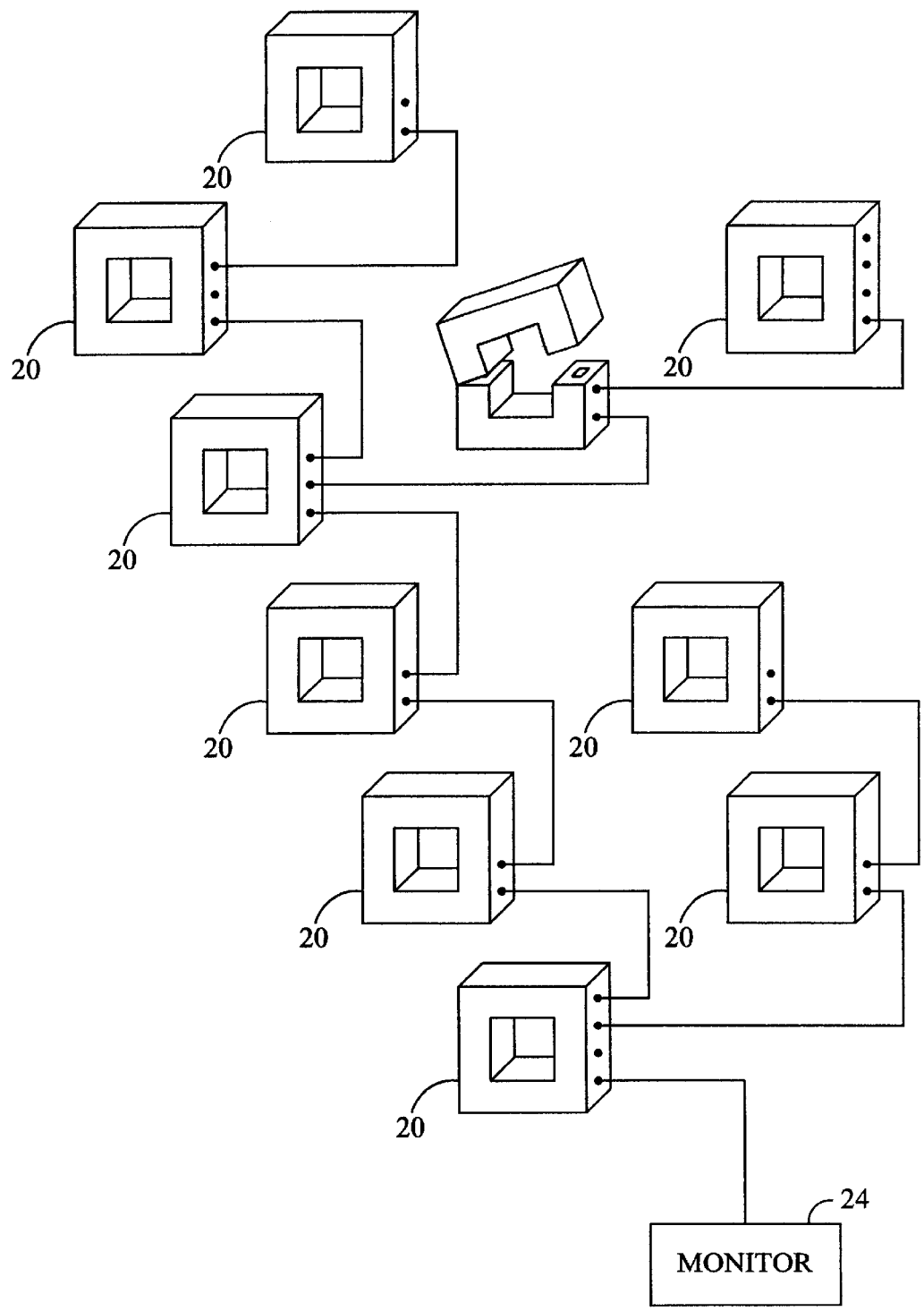
FIG. 4 illustrates an alternative set of interconnected devices and a monitor.

Moreover, simply interconnecting the devices together, preferably in a one-to-one daisy chained relationship, may decrease the likelihood of installation errors and likewise permit flexibility in the number of devices that are interconnected together, as illustrated in FIG. 3. Also, the devices may be designed such that there is a fixed number of devices permanently affixed together, albeit free from being rigidly interconnected with respect to one another. Alternatively, the devices may be detachably interconnectable to one another with each of the devices having one or more interconnections, as illustrated in FIG. 4.

The interconnection between the devices and the signals passed among the interconnections may be time multiplexed, frequency multiplexed, included with an identification, other otherwise encoded using any suitable technique. In this manner each device may be uniquely identified in some manner and the signal from each device may be passed to the monitor. The monitor may be any suitable device for receiving the signals, such as for example, a current monitor, a power monitor, a weather monitor, a personal computer, a weight monitoring system, a scale system, a network analyzer, a train controller, an acoustic vibration monitor for heavy metal bands, and a motion monitor for employees.

One potential technique to provide unique identification for the signals from the devices is to assign an identification to each device, which may be unique if desired. The identification may be programmed into the device from the manufacturer thereby ensuring that it will be unique, at least for the set of devices interconnected to the monitor. Alternatively, the identification may likewise be programmed by the user, or otherwise selected by a set of switches. The identification for each device may be provided to the monitor together with the data from the device. This permits the identification and measurement of the particular quantity, if the device measures a value, without requiring any particular order of interconnection of the devices.

The data provided by the devices may be in any suitable format, range of values, frequencies, currents, voltages, etc. Associated electronics with each device may receive their operational power from an induced current generated within the device, such as a power conductor, which eliminates the need to provide power to the associated electronics. After further consideration, it was determined that self-powered associated electronics may not be capable of providing signals to the device when the associated power conductor includes power flow therein. Accordingly, the associated electronics are preferably powered partially or solely through the communication channel between the devices. Alternatively, the associated electronics may be powered by a separate power connection between the devices or otherwise by a connection to an external power source.

While the identification of the signals from the devices provides a significant improvement, the system still may rely on the technician providing information relating which device is sensing what parameter and its location, if appropriate. In the event that the technician misidentifies which particular device is interconnected to what, then the information obtained by the monitor will be erroneous.

The present inventors came to the realization that the spatial relationship (spaced apart) between the different devices may be used as the basis to identify, preferably in a unique manner, each of the different devices. The spatial relationship of the devices typically relates in many applications to the order of interconnection of the devices.

Figure 5:
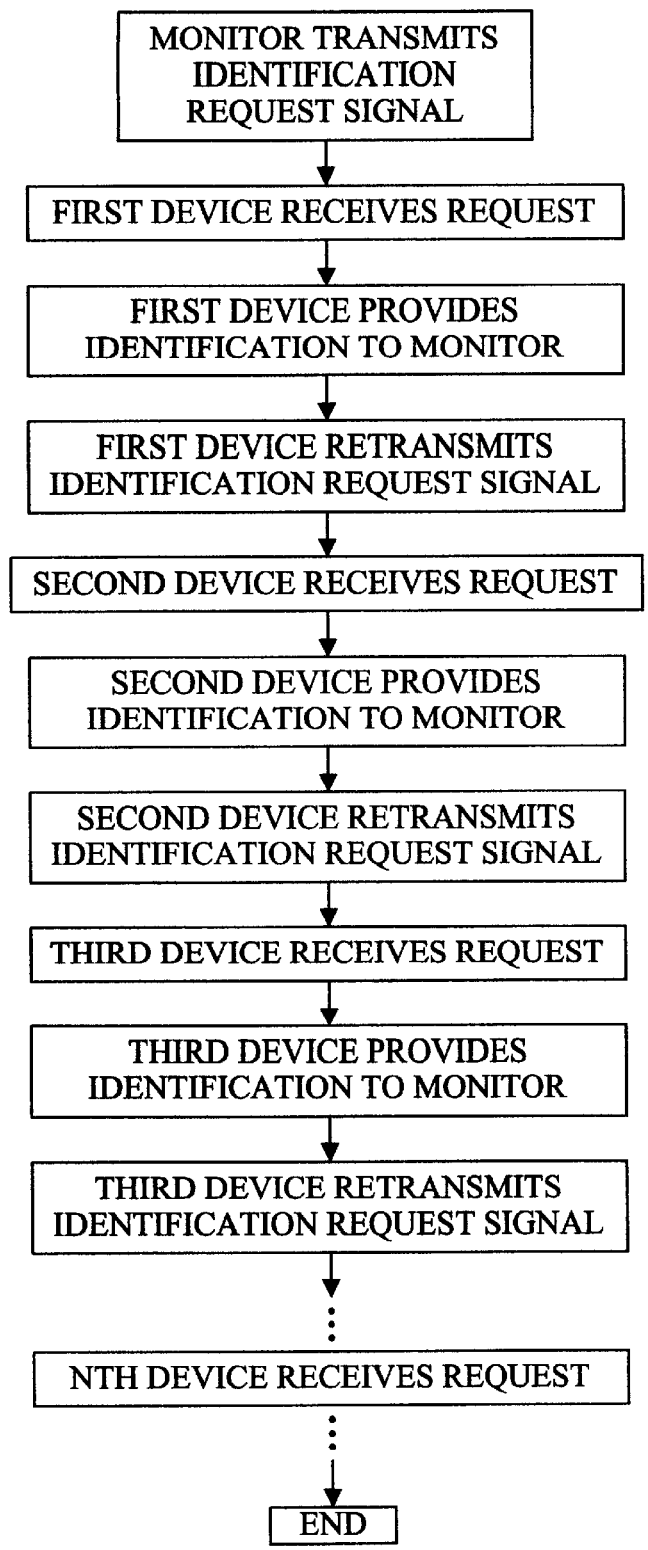
FIG. 5 illustrates one technique of providing data from the devices to the monitor.

With these realizations in mind, the present inventors determined that the propagation of signals, such as for example an identification request signal, within the network of devices may be used as the basis of determining the relative position or interconnection order of each device in the chain. Referring to FIG. 5, the monitor preferably during setup transmits an identification request signal through the wires. The identification request may be transferred through the power wire, communication wire, or a separate identification wire. When the first device receives the identification request signal it provides in response to the monitor its identification, such as its serial number. In this manner, the monitor has the identification of the first device and its relative position to the monitor, namely, the closest device. The first device, preferably after a time delay, retransmits the identification request signal to the next device. The next device, in response to receiving the identification request signal provides to the monitor its identification, such as its serial number. In this manner, the monitor has the identification of the second device and its relative position to the monitor, 24, namely, the second closest device. The second device, preferably after a time delay, retransmits the identification request signal to the next device. The next device, in response to receiving the identification request signal provides to the monitor its identification, such as its serial number. In this manner, the monitor has the identification of the third device and its relative position to the device, namely, the third closest device. The third device, preferably after a time delay, retransmits the identification request signal to the next device. In this manner, the set of devices may be identified together with their relative positions. The technician may use this relative information to configure the monitor by more accurately identifying the particular devices, by merely knowing their relative positions. This reduces the likelihood of error caused by improper wiring installation. Moreover, the sequence of response may then be used as the devices implicit addresses.

Referring again to FIGS. 3 and 4, the present inventors came to the realization that if the devices are implemented with a serial set of interconnections, then the failure of a single device in the chain could render the remaining devices incapable of communicating with the monitor. Moreover, there is significant overhead required with transmitting a set of data through a serial connection of a set of devices, where each devices receives and retransmits the data. To overcome these limitations potentially present with the system shown in FIGS. 3 and 4, the present inventors came to the realization that a combination of an identification signal path and a networked signal path would overcome such limitations.

Figure 6:
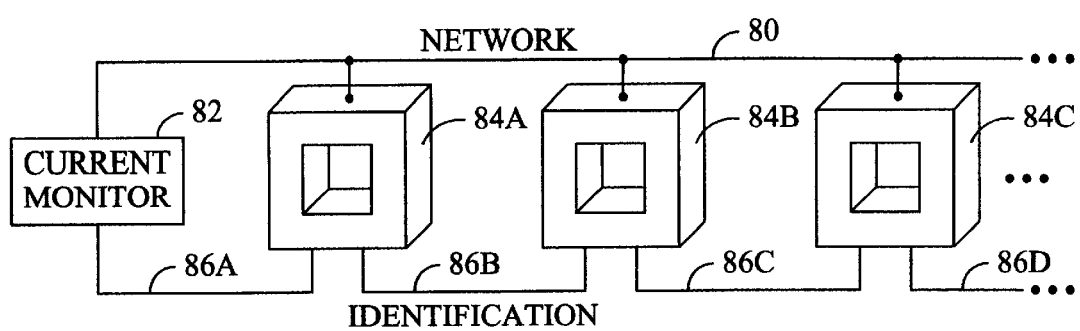
FIG. 6 illustrates one technique of determining the spatial relationship of a set of devices.

Referring to FIG. 6, a network connection 80 may be used to transmit data between the monitor 82 and any of the devices 84. Further, the network connection may be used to transmit data between the devices 84 themselves. The preferred network protocol is RS485. A set of identification connections 86 may be used to interconnect the devices 84 together. During configuration, the monitor 82 transmits an identification request on the identification connection 86a. The device 84a receives this identification request, and in response, provides its identification to the monitor 82 on the network 80. The device 84a transmits an identification request on the identification connection 86b. The device 84b receives this identification request, and in response, provides its identification to the monitor 82 on the network 80. The device 84b transmits an identification request on the identification connection 86c. The device 84c receives this identification request, and in response, provides its identification to the monitor 82 on the network 80. The device 84c transmits an identification request on the identification connection 86d. This process is repeated throughout the set of devices 84. In this manner, the monitor 82 receives the identifications in the order of connection. The identification request may be any signal, such as for example, a high voltage, a low voltage, a ground, a current signal, an encoded signal, a voltage pulse, a current pulse, an open circuit, a short circuit, a phase encoded signal, etc.

In the preferred embodiment the devices 84 include associated electronics to calculate the sensed parameter and thus provide the resulting data to the monitor 82. In this manner, the monitor 82 does not need calibration data to scale the signals from different types or sizes of devices, or otherwise calibrate the data. Each of the devices 84 may be individually calibrated to provide accurate measurements.

There exists the possibility that the measurement electronics associated with the devices may become damaged or otherwise cease to function properly. This is especially the case with a micro-controller is included with the measurement electronics. When the micro-controller ceases to function properly data will not be provided, or otherwise erroneous data will be provided, to the network 80. If the micro-controller is required to receive and transmit the identification request, then as in FIGS. 3 and 4, there may be a possibility that if a micro-controller is damaged then the remaining devices will not be identified properly for the monitor. To avoid the potential possibility of a micro-controller malfunction impacting the identification process, the electronics for receiving and transmitting the identification request are preferably separate from the micro-controller. In other words, if the micro-controller is not operational or otherwise the electronics for sensing and providing data to the network 80 is not operating properly, the electronics for receiving and transmitting the identification request remains operational. In this manner, during the identification process an inoperative device 84 will not prevent the identification of the remaining devices 84. In addition, a malfunctioning device may be identified by repeating the identification process and identifying the lack of an identification response from a particular device. The malfunctioning device may then be replaced or otherwise repaired.

In one embodiment, the components associated with the identification process operate in such a manner that when the power to the device is interrupted or otherwise not available, the default is to pass the identification request to the next device. In this manner, even if the device is not operational, the device still passes the identification request to additional devices so that the remaining devices may be properly identified.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for monitoring properties comprising:
   (a) providing a first device suitable to sense a first property;
   (b) providing a second device suitable to sense a second property;
   (b) providing a first signal from said first device representative of said first property to a monitor; and
   (c) providing a second signal from said second device representative of said second property to said first device which in turn provides said second signal to said monitor, wherein said first device is free from being rigidly interconnected to said second device, wherein said first device is free from being rigidly interconnected to said monitor, wherein said second device is free from being rigidly interconnected to said monitor.

2. The method of claim 1 further comprising:
   (a) providing a third device suitable to sense a third property;
   (b) providing a third signal from said third device representative of said third property to said second device which in turn provides said third signal to said first device which in turn provides said third signal to said monitor, wherein said third device is free from being rigidly interconnected to said first device, said second device, and said monitor.

3. The method of claim 2 wherein said monitor provides an identification request signal to said first device.

4. The method of claim 3 wherein said first device receives said identification request signal and provides, in response thereto, identification data associated with said first device.

5. The method of claim 4 wherein said first device provides said identification request signal to said second device.

6. The method of claim 5 wherein said second device receives said identification request signal and provides, in response thereto, identification data associated with said second device.

7. The method of claim 6 wherein said monitor receives identification data associated with said first device prior to receiving identification data associated with said second device.

8. The method of claim 7 wherein said monitor associates said first device as being interconnected to said monitor between said second device.

9. A method for determining the relative location of devices comprising
   (a) providing a first sensing device;
   (b) providing a second sensing device;
   (c) providing a third sensing device, wherein said first sensing device, said second sensing device, and said third sensing device are free from being rigidly interconnected with respect to one another;
   (d) propagating an identification signal from said first device to said second device to said third device; and
   (e) determining the relative positions of said first device, said second device, and said third device based upon said propagating said identification signal.

10. The method of claim 9 further comprising:
    (a) providing a monitor;
    (b) said determining performed by said monitor based upon signals received by said monitor from said first device, said second device, and said third device.

11. The method of claim 10 wherein said monitor provides an identification request signal to said first device.

12. The method of claim 11 wherein said first device receives said identification request signal and provides, in response thereto, identification data associated with said first device.

13. The method of claim 12 wherein said first device provides said identification request signal to said second device.

14. The method of claim 13 wherein said second device receives said identification request signal and provides, in response thereto, identification data associated with said second device.

15. The method of claim 14 wherein said monitor receives identification data associated with said first device prior to receiving identification data associated with said second device.

16. The method of claim 15 wherein said monitor associates said first device as being interconnected to said monitor between said second device.

17. A method for determining the relative location of devices comprising
    (a) providing a first device;
    (b) providing a second device;
    (c) providing a third device, wherein said first device, said second device, and said third device are free from being rigidly interconnected with respect to one another; and
    (d) determining the relative positions of said first device, said second device, and said third device based upon the temporal response of said first device, said second device, and said third device to an identification signal.

18. The method of claim 17 further comprising:
    (a) providing a monitor;
    (b) said determining performed by said monitor based upon signals received by said monitor from said first device, said second device, and said third device.

19. The method of claim 18 wherein said monitor provides an identification request signal to said first device.

20. The method of claim 19 wherein said first device receives said identification request signal and provides, in response thereto, identification data associated with said first device.

21. The method of claim 20 wherein said first device provides said identification request signal to said second device.

22. The method of claim 21 wherein said second device receives said identification request signal and provides, in response thereto, identification data associated with said second device.

23. The method of claim 22 wherein said monitor receives identification data associated with said first device prior to receiving identification data associated with said second device.

24. The method of claim 23 wherein said monitor associates said first device as being interconnected to said monitor between said second device.

* * * * *